United States Patent
Iino et al.

(10) Patent No.: US 11,299,387 B2
(45) Date of Patent: Apr. 12, 2022

(54) FUEL SHUTOFF VALVE

(71) Applicant: TOYODA GOSEI CO., LTD., Kiyosu (JP)

(72) Inventors: Takuro Iino, Kiyosu (JP); Yoshihiro Sakata, Kiyosu (JP); Hiroaki Kito, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 32 days.

(21) Appl. No.: 16/916,641

(22) Filed: Jun. 30, 2020

(65) Prior Publication Data
US 2021/0024347 A1   Jan. 28, 2021

(30) Foreign Application Priority Data

Jul. 23, 2019   (JP) .............................. JP2019-134990

(51) Int. Cl.
*B67D 7/36* (2010.01)
*F16K 24/04* (2006.01)

(52) U.S. Cl.
CPC .................... *B67D 7/367* (2013.01)

(58) Field of Classification Search
CPC ....... F16K 24/044; B67D 7/367; B67D 7/365; B60K 2015/03289
USPC ....................................................... 137/202
See application file for complete search history.

(56) References Cited

U.S. PATENT DOCUMENTS

| | | | | |
|---|---|---|---|---|
| 5,443,561 A | * | 8/1995 | Sakata | B60K 15/03519 137/202 |
| 6,439,206 B1 | * | 8/2002 | Shimamura | F02M 25/0836 123/516 |
| 8,490,603 B2 | * | 7/2013 | Kuwayama | B60K 15/03 123/518 |
| 2010/0218748 A1 | * | 9/2010 | Arnalsteen | F16K 17/194 123/516 |
| 2012/0024853 A1 | | 2/2012 | Kuwayama et al. | |
| 2017/0072787 A1 | * | 3/2017 | Mihara | B60K 15/035 |
| 2019/0263256 A1 | * | 8/2019 | Iino | B60K 15/03504 |

FOREIGN PATENT DOCUMENTS

| | | |
|---|---|---|
| JP | 2004-036449 A | 2/2004 |
| JP | 2012-047169 A | 3/2012 |
| JP | 2014-080870 A | 5/2014 |

* cited by examiner

*Primary Examiner* — Paul J Gray
(74) *Attorney, Agent, or Firm* — Posz Law Group, PLC

(57) ABSTRACT

A casing 100 of fuel shutoff valve 10 includes a housing 120 having a partition part 122 with a communication hole 124, the partition part 122 dividing the inside of the casing into an upper space CU and a lower space CL, a check valve case 140 supporting a check valve structure 142, and a cutoff valve case 160 storing a float 162. The casing 100 includes a communication passage C10 connecting a space C16 storing the float 162 and a space C14 in the check valve case 140 and having a delivery opening 168 of the cutoff valve case, the communication hole 124, and a reception opening 146 of the check valve case. The reception opening 146 deviates relative to the delivery opening 168. The check valve case 140 includes an additional flow path part C142 allowing the circulation of fuel vapor, together with the communication hole.

2 Claims, 11 Drawing Sheets

FUEL SHUTOFF VALVE

CROSS REFERENCE TO RELATED APPLICATIONS

The present application claims the priority based on Japanese Patent Application No. 2019-134990 filed on Jul. 23, 2019, the disclosure of which is hereby incorporated by reference in its entirety.

BACKGROUND

Field

The present disclosure relates to a fuel shutoff valve.

Related Art

Conventionally, a fuel tank receiving a supply of volatile fuel from the outside, retaining the fuel, and supplying the fuel to the outside has a mechanism for receiving the supply of fuel and a mechanism for adjusting an inner pressure. Specifically, the fuel tank includes a full tank detection valve, a check valve, and a cutoff valve.

When a fuel tank receives a supply of fuel from the outside and the fuel in the fuel tank has reached a predetermined amount, the full tank detection valve stops discharge of vaporized fuel (hereinafter, also referred to as "fuel vapor") from the inside of the fuel tank and increases an inner pressure of the fuel tank. This consequently increases a liquid level of the fuel in a fuel supply pipe connected to the fuel tank and stops the supply of fuel from a fueling gun. As a result, a user can recognize that the fuel tank is full. When the fuel tank becomes full, the check valve blocks a flow path and keeps an inner pressure of the fuel tank for a certain period of time to avoid overfilling. As a result, a user can continually recognize that the fuel tank is full. Moreover, when an inner pressure of the fuel tank has increased abnormally by additional fueling by a user, for example, the check valve discharges fuel vapor in the fuel tank to the outside to reduce an inner pressure of the fuel tank. To adjust an inner pressure of the fuel tank, the cutoff valve allows gas to pass in a flow path connecting the inside of the fuel tank and the outside while preventing an outflow of liquid fuel.

However, such mechanisms exerting mutually different functions and piping connecting the mechanisms limit an amount of fuel storable in the fuel tank. Thus, there have been demanded smaller mechanisms for achieving the above-described functions.

SUMMARY

The present disclosure may be achieved by the following aspects.

One aspect of the disclosure provides a fuel shutoff valve including a casing that allows circulation of fuel vapor in a fuel tank and a lid body that is attached to one end of the casing to change a direction of the circulation of fuel vapor having passed through the casing and send the fuel vapor to the outside. In the fuel shutoff valve, the casing includes a housing that is provided with a partition part dividing the inside of the casing into an upper space and a lower space, the partition part having a communication hole allowing communication between the upper space and the lower space, a check valve case that supports, in the upper space, a check valve structure maintaining an inner pressure of the fuel tank in a predetermined range, and a cutoff valve case that stores, in the lower space, a float functioning as a cutoff valve preventing an outflow of liquid fuel through the casing. The casing includes a communication passage connecting a space storing the float in the cutoff valve case and a space communicating to the outside in the check valve case, the communication passage including a delivery opening provided in the cutoff valve case, the communication hole provided in the partition part, and a reception opening provided in the check valve case. The reception opening is arranged at a position deviating to the inner side of the fuel shutoff valve relative to the delivery opening. The check valve case includes an additional flow path part that is a part of the communication passage, the additional flow path part allowing the circulation of fuel vapor from the delivery opening to the reception opening together with the communication hole.

DETAILED DESCRIPTION

Figure 1:
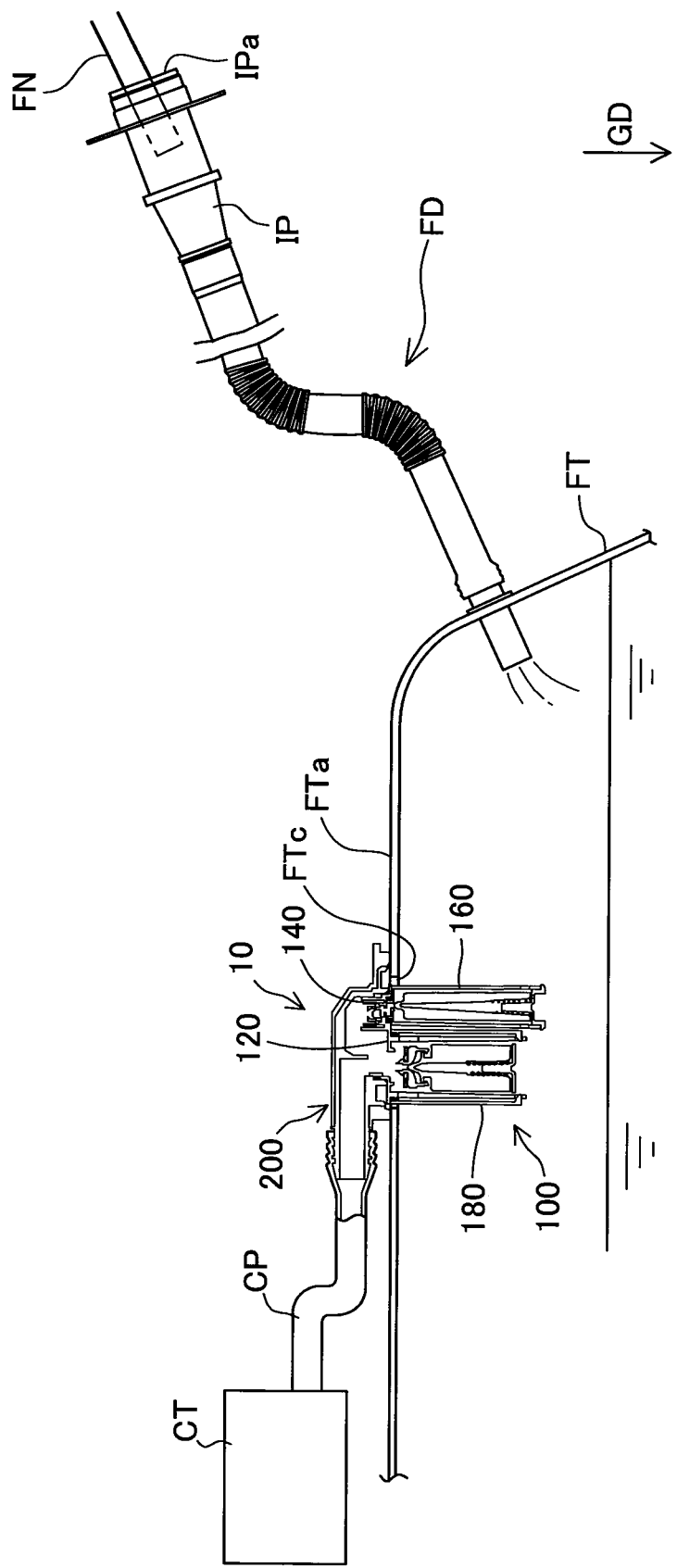
FIG. 1 is an explanatory diagram illustrating a fuel tank FT provided with a fuel valve 10 according to a first embodiment, a feeding device FD, and a canister CT.

A. First Embodiment (1) Entire Structure:

FIG. 1 is an explanatory diagram illustrating the fuel tank FT provided with the fuel valve 10 according to the first embodiment, the feeding device FD, and the canister CT. FIG. 1 illustrates the vertically lower direction by an arrow GD.

The fuel tank FT is provided in a vehicle and retains volatile liquid fuel supplied to an internal combustion engine of the vehicle. The fuel tank FT includes a barrier layer made of ethylene vinyl alcohol copolymer (EVOH) and an outer layer made of polyethylene (PE). The fuel tank FT includes an upper wall FTa. The upper wall FTa has an attachment hole FTc for attaching the fuel valve 10. The fuel valve 10 and the feeding device FD are connected to the fuel tank FT.

The feeding device FD feeds liquid fuel supplied from a fueling nozzle FN into the fuel tank FT. The feeding device FD includes a fuel injection pipe IP. An injection port IPa is formed at one end of the fuel injection pipe IP. The other end of the fuel injection pipe IP is arranged inside the fuel tank FT. To supply liquid fuel to the fuel tank FT from the fueling nozzle FN, the fueling nozzle FN is inserted to the injection port IPa. The fuel supplied from the fueling nozzle FN passes through the fuel injection pipe IP to the fuel tank FT. A fuel sensor (not illustrated) is arranged inside the distal end of the fueling nozzle FN. If the fuel sensor comes into contact with liquid fuel, the fueling nozzle FN automatically stops supply of the fuel.

The canister CT traps fuel vapor supplied from the fuel tank FT. The canister CT is connected to the fuel tank FT through the fuel valve 10 and a canister connection pipe CP. The canister CT is provided with an activated charcoal. The canister CT allows vaporized fuel to be adsorbed onto the activated charcoal and then removes the fuel adsorbed on the activated charcoal from the activated charcoal.

The fuel valve 10 is attached to the attachment hole FTc provided on the upper wall FTa of the fuel tank FT. The upper part of the fuel valve 10 is positioned outside the fuel tank FT. The lower part of the fuel valve 10 is positioned inside the fuel tank FT. The upper part of the fuel valve 10 is connected to the canister CT through the canister connection pipe CP. The fuel valve 10 controls the circulation of liquid between the inside of the fuel tank FT and the canister connection pipe CP. For example, when liquid fuel is supplied to the fuel tank FT from the fueling nozzle FN and a liquid level of the fuel in the fuel tank FT has reached a predetermined position, the fuel valve 10 restricts an outflow of fuel vapor to the canister CT and automatically stops the supply of fuel by the fueling nozzle FN.

Figure 2:
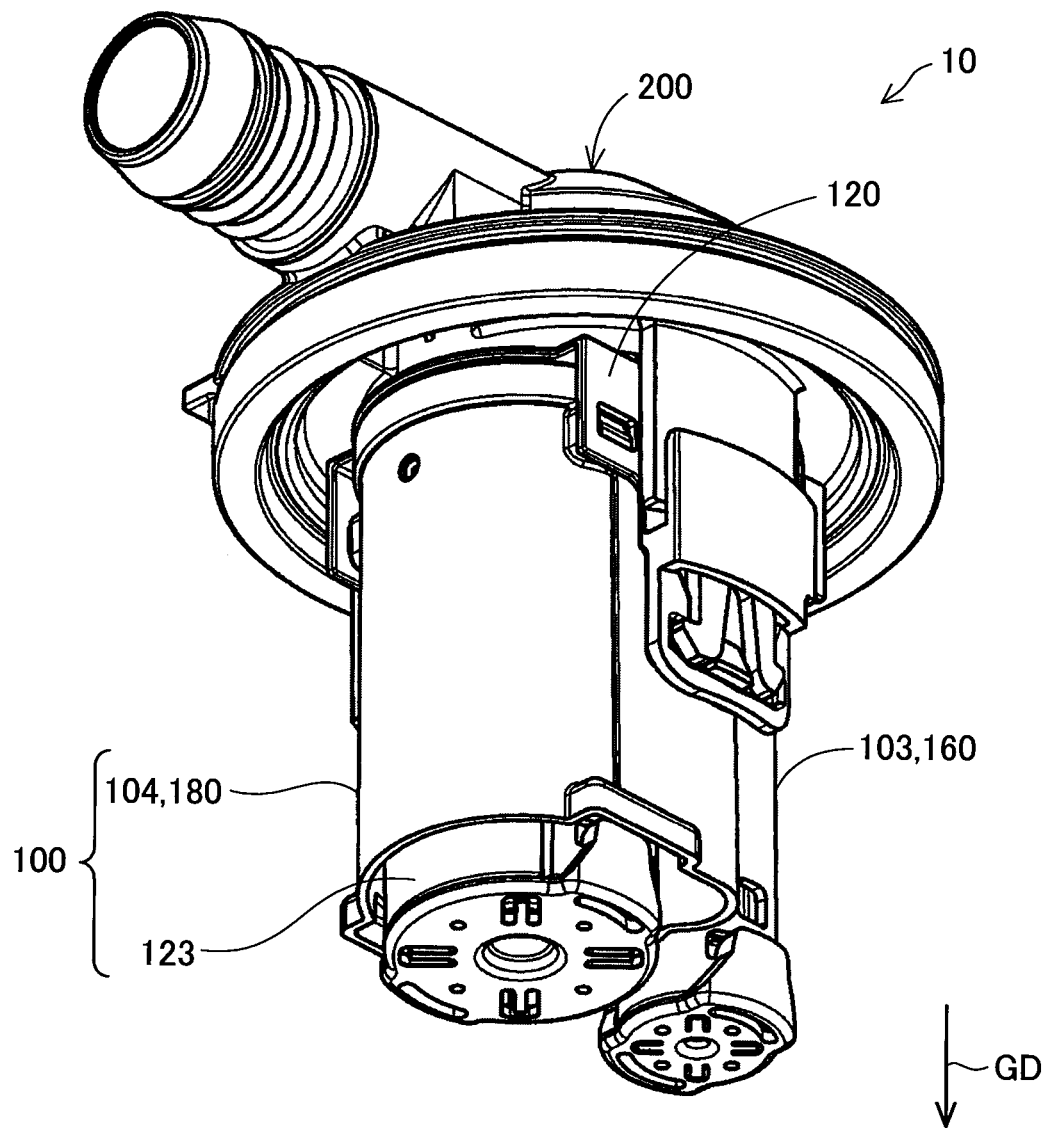
FIG. 2 is a perspective view of the fuel valve 10.
Figure 3:
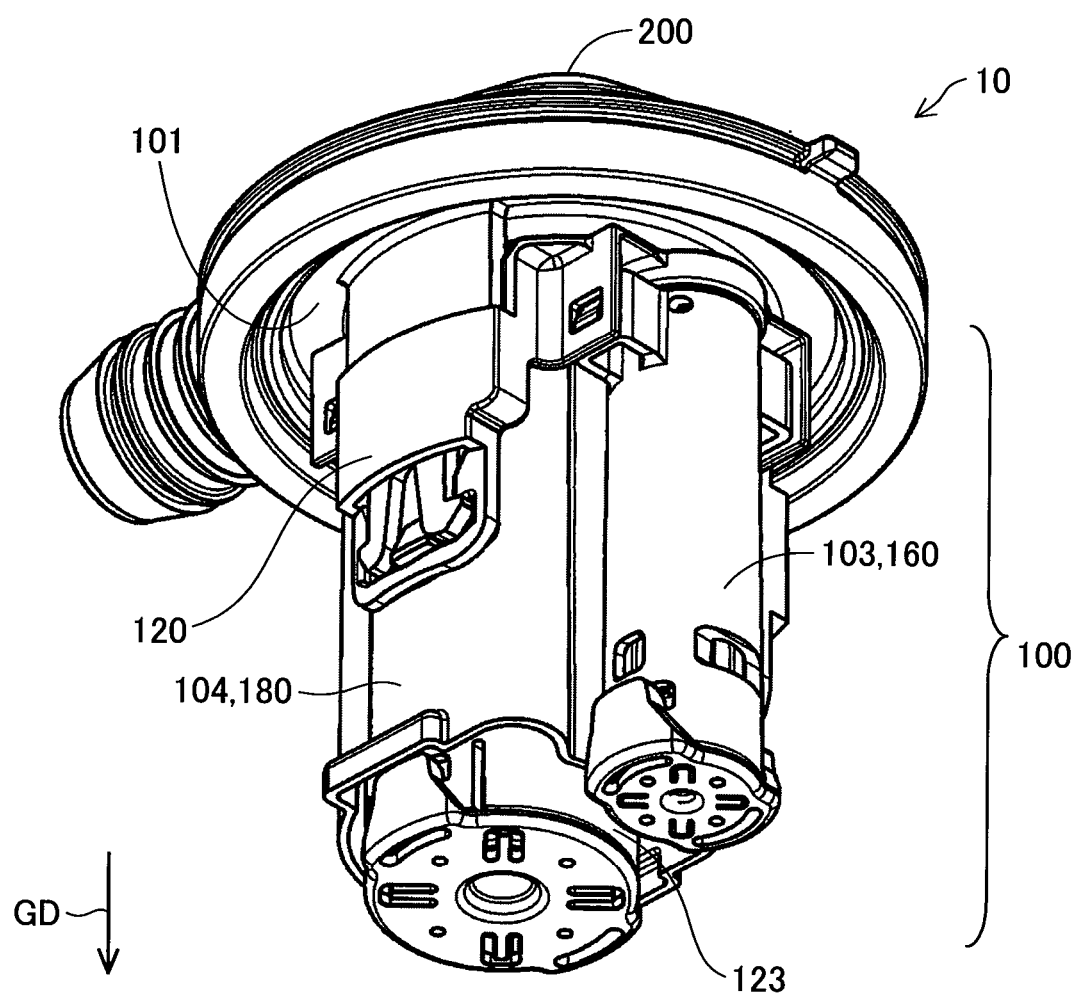
FIG. 3 is a perspective view of the fuel valve 10, viewed from a different direction than FIG. 2.

(2) Structure of Fuel Valve:

FIG. 2 is a perspective view of the fuel valve 10. FIG. 3 is a perspective view of the fuel valve 10, viewed from a different direction than FIG. 2. The fuel valve 10 includes a casing 100 and a lid body 200.

The casing 100 allows fuel vapor in the fuel tank FT to pass through the casing 100 and sends it out to the lid body 200. The casing 100 has a shape including a disk part 101, one cylindrical part 102 arranged on one surface of the disk part 101 so that a central axis CA10 of the cylindrical part 102 is positioned in the center of the disk part 101, and two cylindrical parts 103, 104 arranged on the other surface of the disk part 101 so that central axes CA16, CA18 of the cylindrical parts 103, 104 are positioned not to match the center of the disk part 101. Note that in FIG. 2, the disk part 101 does not appear externally. The disk part 101 of the shape of the casing 100 corresponds to a partition part 122 described later. One cylindrical part 102 of the shape of the casing 100 corresponds to a part of the housing 120 described later. Two cylindrical parts 103, 104 of the shape of the casing 100 correspond to a cutoff valve case 160 and a full tank detection valve case 180 that are described later. The cylindrical part 102 is covered by the lid body 200, and thus it is not illustrated in FIG. 2 and FIG. 3. The casing 100 is mainly made of polyacetal (POM).

The lid body 200 is attached at one end of the casing 100 and changes a direction of the circulation of fuel vapor having passed through the casing 100 and sends the fuel vapor to the outside. In the posture where the fuel valve 10 is provided in a vehicle, the lid body 200 is attached at a position corresponding to the upper end of the casing 100. In the following, when the upper, lower, and horizontal directions are referred to, the description will be made with the posture where the fuel valve 10 is provided in a vehicle as a reference posture.

Figure 4:
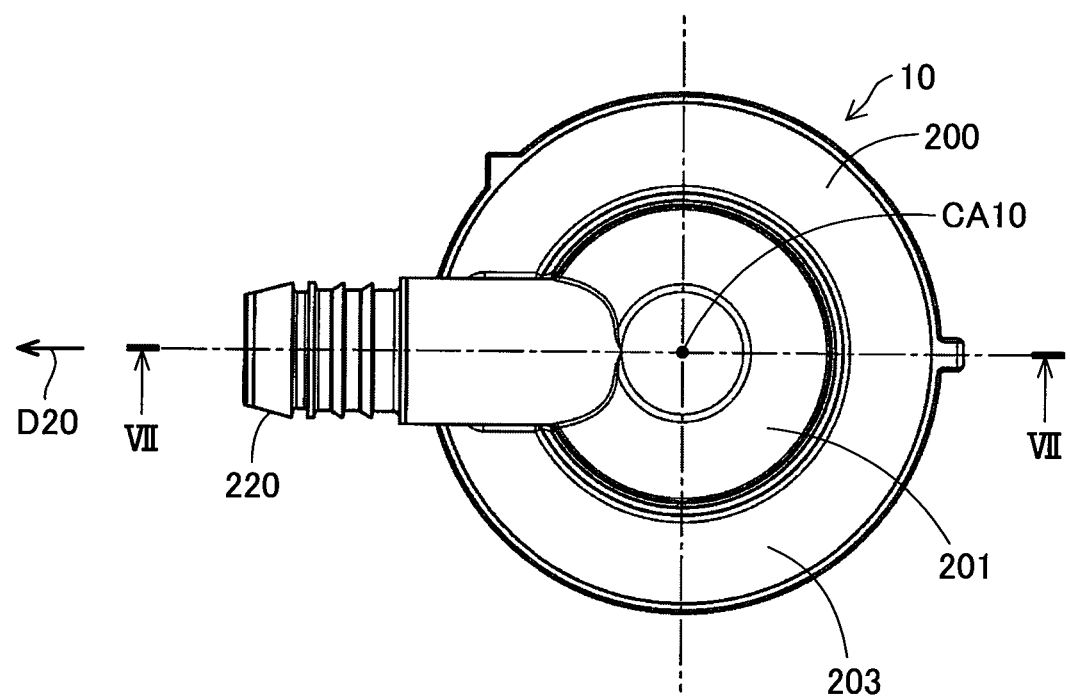
FIG. 4 is an upper view of the fuel valve 10.
Figure 5:
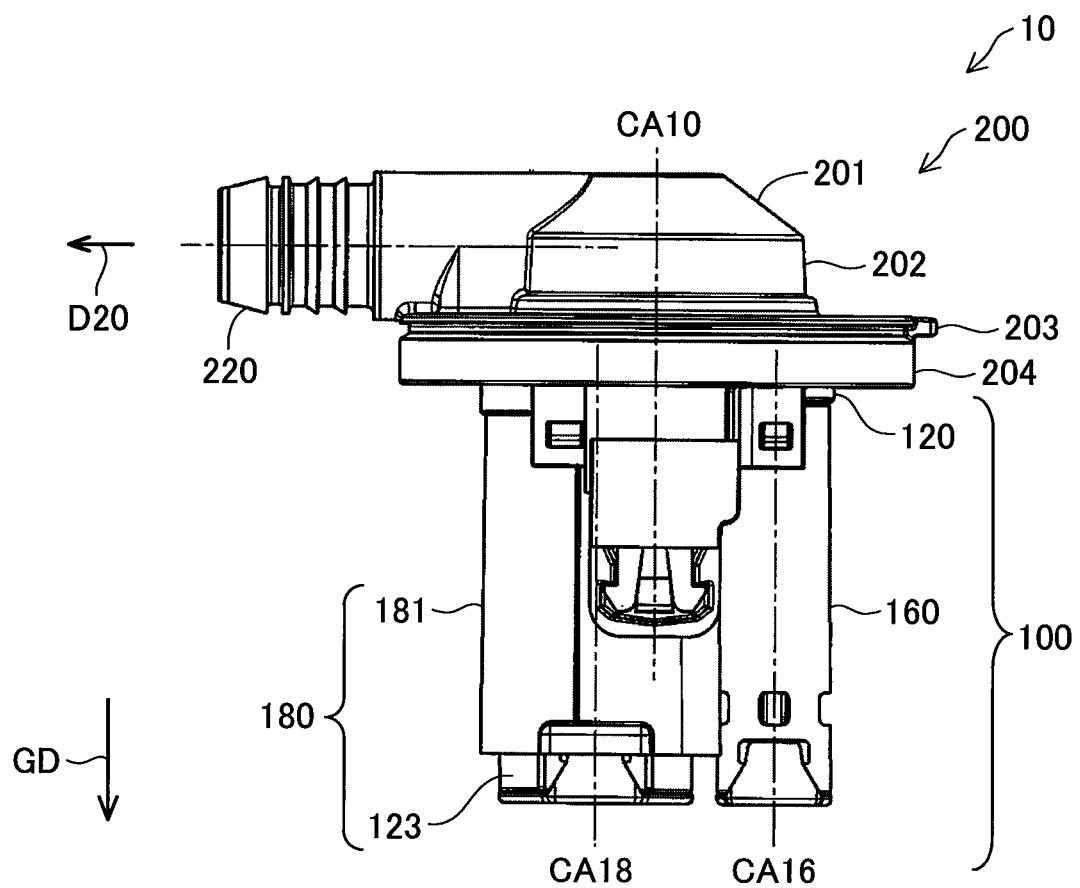
FIG. 5 is a side view of the fuel valve 10.

FIG. 4 is an upper view of the fuel valve 10. FIG. 5 is a side view of the fuel valve 10. The lid body 200 includes a truncated cone part 201 having a truncated cone shape with a blocked upper end, a first cylindrical part 202 connected to the lower end of the truncated cone part 201, a flange part 203 provided at the lower end of the first cylindrical part 202, and a second cylindrical part 204 provided in the vicinity of an outer edge of the flange part 203. The central axis of the truncated cone part 201, the central axis of the first cylindrical part 202, the central axis of the flange part 203, and the central axis of the second cylindrical part 204 match to one another. These central axes match the central axis CA10 of the cylindrical part 102 of the casing 100. In the following, the central axis CA10 is also referred to as a "central axis CA10 of the lid body 200".

The lid body 200 includes a delivery pipe 220 extending, from the side surfaces of the truncated cone part 201 and the first cylindrical part 202, in a direction D20 perpendicular to the central axis CA10 thereof. The inner space of the delivery pipe 220 is communicated to the inner space of the truncated cone part 201 and the inner space of the first cylindrical part 202. The canister connection pipe CP is connected to the delivery pipe 220 (see FIG. 1). The lid body 200 is formed with a double-layer structure of polyethylene forming the outer part and polyamide forming the inner part.

The lid body 200 receives fuel vapor from the casing 100 positioned on the lower side of the lid body 200 and sends out the fuel vapor in the horizontal direction from the delivery pipe 220. The circulation direction of the fuel vapor sent out by the lid body 200 is a direction illustrated by an arrow D20 (see FIG. 5).

Figure 6:
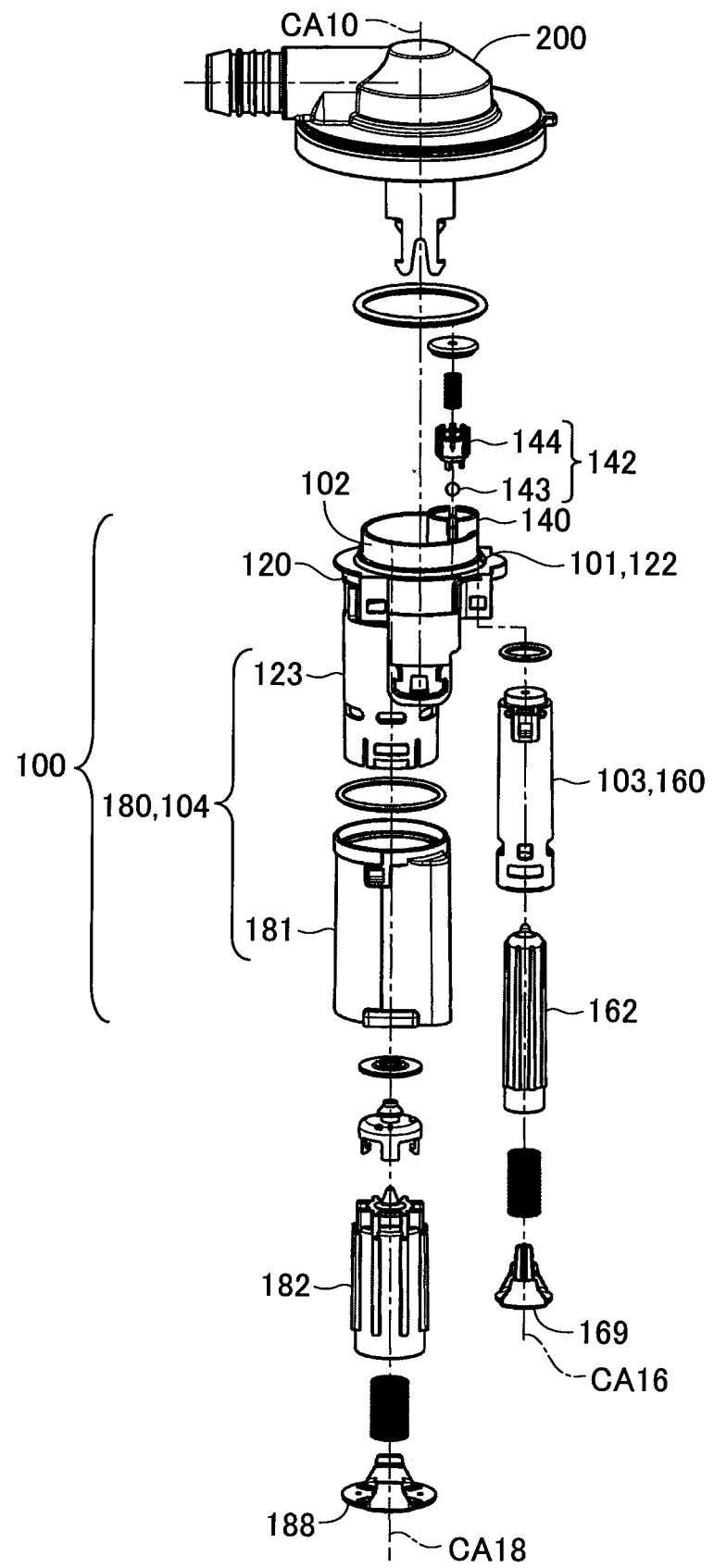
FIG. 6 is an exploded view of the fuel valve 10.
Figure 7:
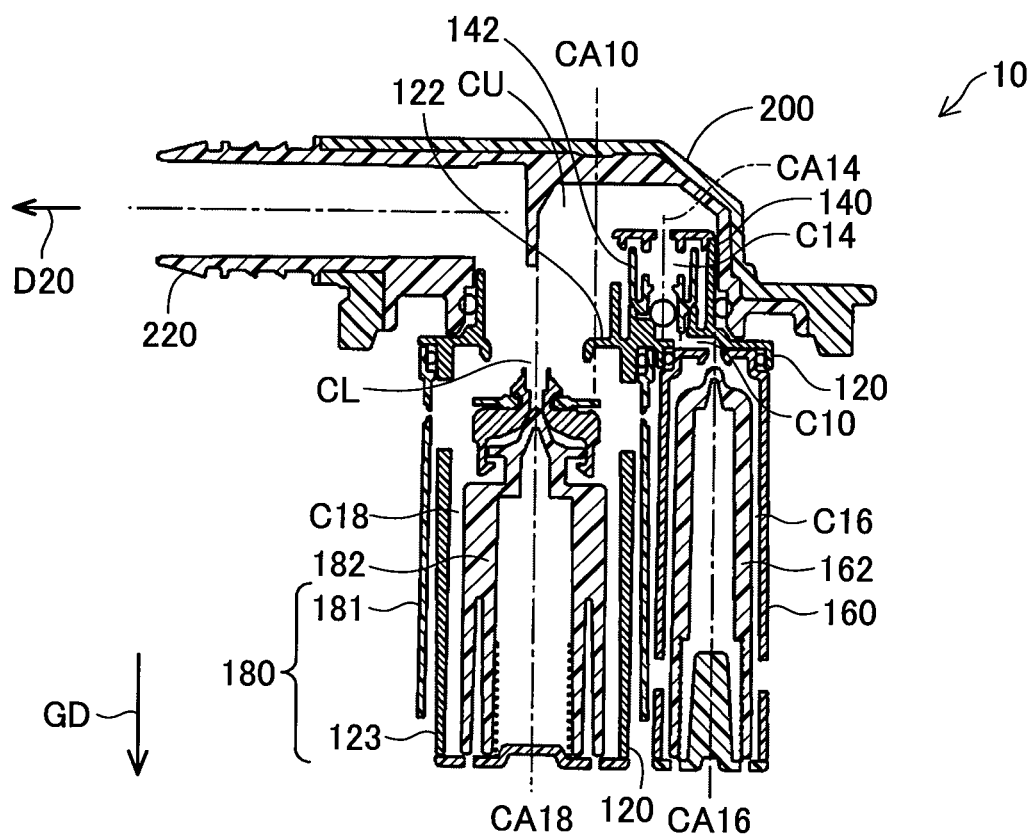
FIG. 7 is an end view of a VII-VII section in FIG. 4.

FIG. 6 is an exploded view of the fuel valve 10. FIG. 7 is an end view of a section in FIG. 4. The casing 100 includes the housing 120, the check valve case 140, the cutoff valve case 160, and a skirt 181.

The housing 120 includes the partition part 122 and a tubular part 123 (see the center part of FIG. 6 and the center part of FIG. 7). The partition part 122 is substantially disk-shaped. The partition part 122 divides the inner part of the casing 100 into an upper space CU and a lower space CL. The partition part 122 is arranged at the substantially same position in the vertical direction GD as the upper wall FTa of the fuel tank FT (see FIG. 1).

Figure 8:
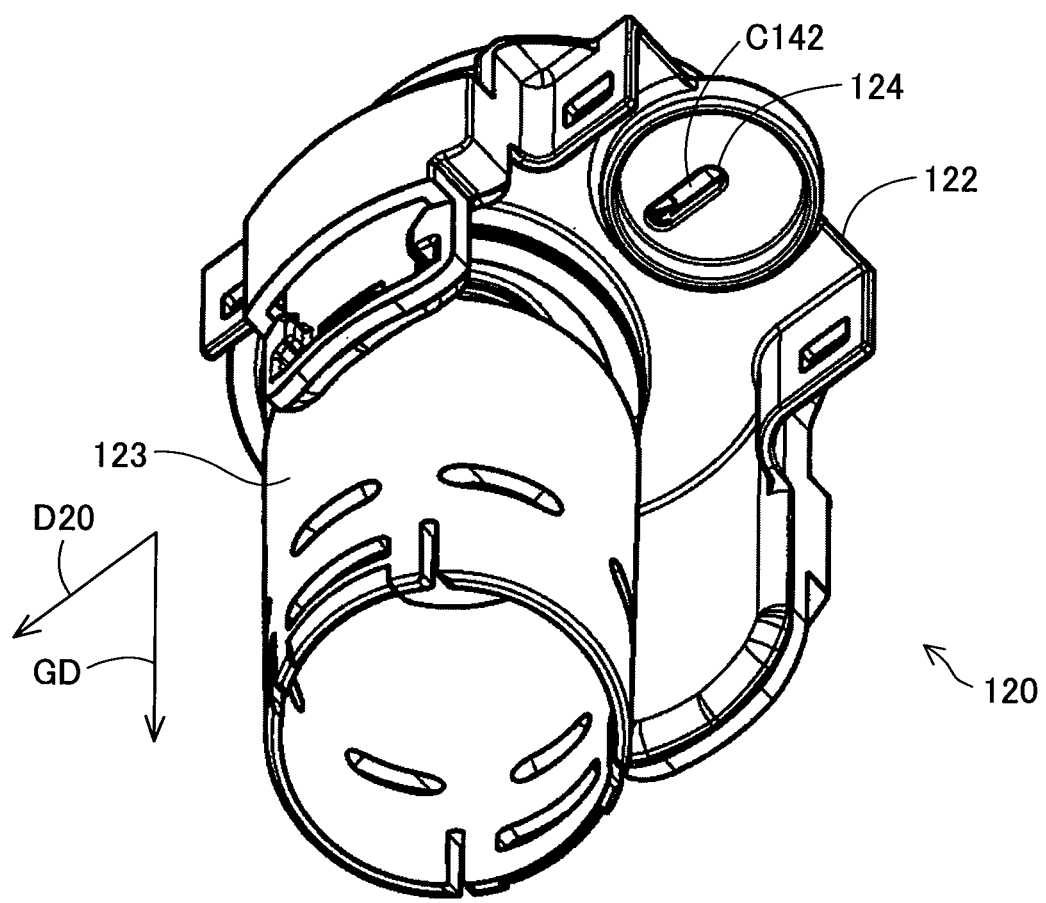
FIG. 8 is a perspective view of a housing 120.
Figure 9:
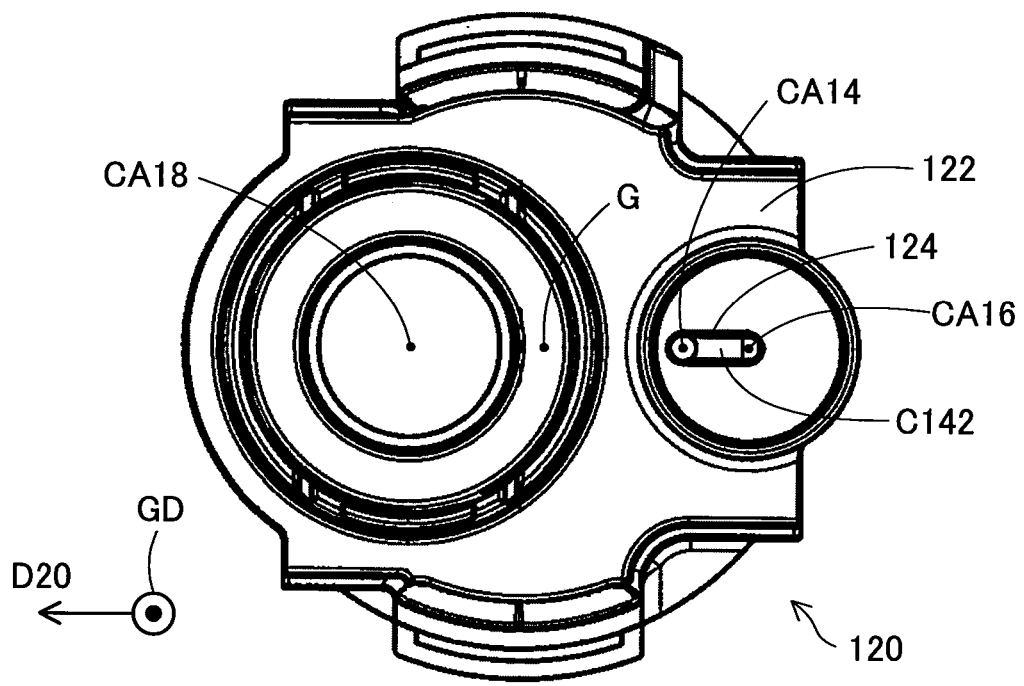
FIG. 9 is a bottom view of the housing 120.

FIG. 8 is a perspective view of the housing 120. FIG. 9 is a bottom view of the housing 120. The partition part 122 has a communication hole 124 connecting the upper space CU and the lower space CL.

The tubular part 123 is a substantially cylindrical structure provided on the lower surface of the partition part 122 (see FIG. 6 and FIG. 8). FIG. 6 and FIG. 7 illustrate the central axis of the tubular part 123 by CA18. Most of the tubular part 123 excluding the lower end is positioned inside the skirt 181 attached to the housing 120 (see FIG. 7).

The check valve case 140, the cutoff valve case 160, and the skirt 181 are attached to the housing 120 (see FIG. 6 and FIG. 7). The skirt 181 and the tubular part 123 of the housing 120 form the full tank detection valve case 180. Note that the check valve case 140 may be provided integrally with the housing 120.

The check valve case 140 is a substantially cylindrical structure provided on the upper surface of the partition part 122 (see FIG. 6 and FIG. 7). FIG. 7 illustrates the central axis of the check valve case 140 by CA14. The check valve case 140 is arranged inside the cylindrical part 102 of the housing 120 and the lid body 200. The check valve case 140 is positioned outside the fuel tank FT (see FIG. 1).

Figure 10:
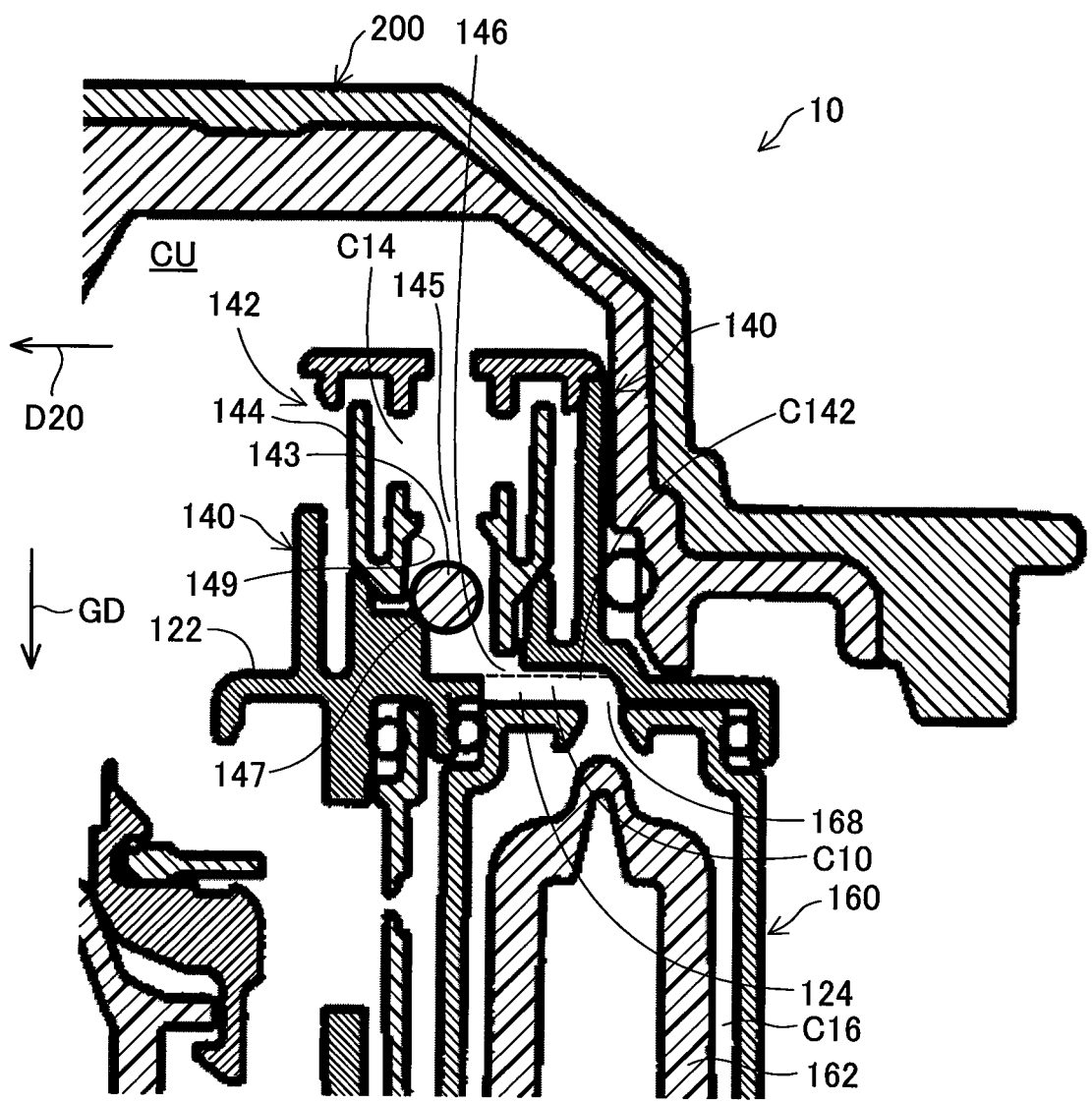
FIG. 10 is an enlarged view of the vicinity of a check valve case 140 in FIG. 7.

FIG. 10 is an enlarged view of the vicinity of the check valve case 140 in FIG. 7. The bottom surface of the check valve case 140 has a reception opening 146 in an area including the central axis CA14. The reception opening 146 connects space C14 communicated to the outside in the check valve case 140 and the communication hole 124 of the partition part 122. The check valve case 140 supports a check valve structure 142 in the upper space CU. The check valve structure 142 includes a ball 143 as a valve element and a valve seat 144.

In a steady state of a vehicle such as during traveling or refueling, the ball 143 is at a position separated downward from a delivery port 145 of the valve seat 144 and is arranged on a support part 147. At this time, the check valve structure 142 is open. The fuel vapor during refueling circulates from a space C16 in the cutoff valve case 160 to the space C14 in the check valve case 140 and the upper space CU in the casing 100.

In a state where the full tank detection valve described later has detected the full state, the ball 143 rises from the support part 147 and comes into contact with the delivery port 145 of the valve seat 144. At this time, the check valve structure 142 is closed. That is, the communication between the space C16 in the cutoff valve case 160 and the space C14 in the check valve case 140 and the upper space CU in the casing 100 is blocked. More specifically, the check valve structure 142 is adjusted to maintain a pressure value in the fuel tank FT for which the full tank detection valve has detected the full state in a given range for a certain period of time. As a result, the check valve structure 142 functions as an additional fueling prevention valve. However, a delivery port formation part 149 forming the delivery port 145 has a slit, and thus a part of the fuel vapor is sent to the outside. Moreover, when a pressure in the fuel tank FT has exceeded a predetermined pressure threshold by additional fueling after full state detection, the valve seat 144 rises to be separated from the housing 120, whereby fuel vapor in the fuel tank FT is discharged to the outside. That is, the check valve structure 142 is open, and the space C16 in the cutoff valve case is communicated to the space C14 in the check valve case 140 and the upper space CU in the casing 100. As a result, the check valve structure 142 prevents a high pressure in the fuel tank FT.

The cutoff valve case 160 is a substantially cylindrical structure connected to the lower surface of the partition part 122 (see FIG. 6 and FIG. 7). FIG. 7 illustrates the central axis of the cutoff valve case 160 by CA16. Most of the cutoff valve case 160 is positioned in the fuel tank FT (see FIG. 1). The upper surface of the cutoff valve case 160 has a delivery opening 168 in the area including the central axis CA16 in the center thereof (see FIG. 10). The delivery opening 168 is connected to the communication hole 124 of the partition part 122. A bottom part 169 is attached to the lower end of the cutoff valve case 160 (see FIG. 6). The cutoff valve case 160 stores a float 162 in the lower space CL (see FIG. 7). FIG. 7 and FIG. 10 illustrate the space in the cutoff valve case 160 where the float 162 is stored as the space C16.

When liquid fuel is supplied from the fueling nozzle FN and a pressure in the fuel tank FT has exceeded a pressure threshold, fuel vapor in the fuel tank FT passes through the cutoff valve case 160 and the delivery opening 168 and is sent to the outside of the cutoff valve case 160. The float 162 functions as a cutoff valve preventing an outflow of liquid fuel through the casing 100. That is, when a liquid surface of liquid fuel in the fuel tank FT has vibrated and risen, the float 162 moves upward in the space C16 and blocks the delivery opening 168. This consequently prevents an outflow of liquid fuel through the delivery opening 168.

The full tank detection valve case 180 is a substantially cylindrical structure connected, next to the cutoff valve case 160, to the lower surface of the partition part 122 (see FIG. 6 and FIG. 7). The full tank detection valve case 180 includes the skirt 181 and the tubular part 123 of the housing 120. The central axis of the full tank detection valve case 180 matches the central axis CA18 of the tubular part 123. Most of the full tank detection valve case 180 is positioned in the fuel tank FT (see FIG. 1). The upper surface of the full tank detection valve case 180 has an opening in the area including the central axis CA18 in the center thereof. A bottom part 188 is attached to the lower end of the full tank detection valve case 180. The full tank detection valve case 180 stores the float 182 in the lower space CL (see FIG. 7). FIG. 7 illustrates the space in the full tank detection valve case 180 where the float 182 is stored as the space C18.

The float 182 functions as a full tank detection valve. That is, when the fuel tank FT receives supply of liquid fuel from the fueling nozzle FN and a liquid surface of the liquid fuel in the fuel tank FT reaches a predetermined position, the float 182 moves upward in the space C18 and blocks the opening in the center of the upper surface of the full tank detection valve case 180. This consequently stops the discharge of fuel vapor through the opening. Once the discharge of fuel vapor from the fuel tank FT is stopped with the float 182, an inner pressure of the fuel tank FT is increased. This stops movement of liquid fuel from the fuel injection pipe IP into the fuel tank FT (see FIG. 1). As a result, the fuel sensor provided at the distal end of the fueling nozzle FN detects liquid fuel, and then the fuel supply from the fueling gun is stopped.

(3) Structure of Communication Passage:

The casing 100 includes the communication passage C10 connecting the space C16 storing the float 162 in the cutoff valve case 160 and the space C14 communicating to the outside in the check valve case 140 (see center part in FIG. 10).

The communication passage C10 includes the delivery opening 168 provided in the cutoff valve case 160, the communication hole 124 provided in the partition part 122, and the reception opening 146 provided in the check valve case 140. The reception opening 146 of the check valve case 140 is provided at a position deviating to the inner side of the fuel valve 10 relative to the delivery opening 168 of the cutoff valve case 160 (see FIG. 10 and CA14 and CA16 of FIG. 7). Note that "A is provided at a position deviating to the inner side of the fuel valve 10 relative to B" indicates that, when viewed along the central axis CA16 of the cutoff valve case 160, a distance between the center of gravity G of the area occupied by the fuel valve 10 and A is smaller than a distance between the center of gravity G of the area occupied by the fuel valve 10 and B (see FIG. 9). In the embodiment, the reception opening 146 of the check valve case 140 is arranged at a position deviating to the direction of the full tank detection valve case 180 relative to the delivery opening 168 of the cutoff valve case 160. Moreover, in the embodiment, the reception opening 146 of the check valve case 140 is arranged at a position deviating to the circulation direction D20 of the fuel vapor sent out by the lid body 200 relative to the delivery opening 168 of the cutoff valve case 160. The reception opening 146 of the check valve case 140 and the delivery opening 168 of the cutoff valve case 160, which are arranged at positions deviating from each other, are connected by the communication hole 124.

With such a structure, in the fuel valve exerting the functions of the cutoff valve and the check valve, it is possible to downsize the fuel valve 10 as a whole as compared with the form in which the delivery opening 168 of the cutoff valve case 160 and the reception opening 146 of the check valve case 140 are arranged next to each other in a direction perpendicular to the circulation direction D20 of the fuel vapor sent out by the lid body 200 (see GD of FIG. 10).

In the form where the delivery opening 168 and the reception opening 146 are arranged in the vertical direction GD, the part farthest from the central axis CA10 of the lid body 200 in the outer wall of the check valve case 140 is arranged at a position substantially the same as the outer wall of the cutoff valve case 160 (see the upper stage right part of FIG. 7 and the center stage right part in FIG. 10). Meanwhile, on the opposite side of the check valve case 140 relative to the central axis CA10 of the lid body 200, the delivery pipe 220 projects toward the direction D20 (see the upper stage left part of FIG. 7). Thus, in the form where the delivery opening 168 and the reception opening 146 are arranged next to each other in the vertical direction GD, the size of the lid body 200 in the direction D20 is larger.

However, in the embodiment, the reception opening 146 of the check valve case 140 is arranged at a position deviating to the circulation direction D20 of the fuel vapor sent out by the lid body 200 relative to the delivery opening 168 of the cutoff valve case 160 (see the upper stage right part of FIG. 7). In this manner, it is possible to arrange the check valve case 140 closer to the central axis CA10 of the lid body 200. Thus, in the embodiment, it is possible to downsize the lid body 200 in the direction D20 as compared with the form in which the delivery opening 168 and the reception opening 146 are arranged next to each other in the vertical direction GD. This consequently downsizes the fuel valve 10 as a whole.

The check valve case 140 includes, on the bottom surface, an additional flow path part C142 recessed upward (see FIG. 8 to FIG. 10). FIG. 10 illustrates a position of the bottom surface of the check valve case 140 except for the additional flow path part C142 by a broken line. The additional flow path part C142 is provided in the area occupied by the communication hole 124 when projected along the central axis CA10 (see FIG. 9). The additional flow path part C142 forms a part of the communication passage C10. Together with the communication hole 124, the additional flow path part C142 allows the circulation of fuel vapor sent out from the delivery opening 168 of the cutoff valve case 160 into the reception opening 146 of the check valve case 140 (see FIG. 10).

With such a structure, it is possible to allow fuel vapor to circulate more smoothly from the delivery opening 168 of the cutoff valve case 160 toward the reception opening 146 of the check valve case 140 as compared with the form in which the additional flow path part C142 is not provided.

The fuel valve 10 of the embodiment is also referred to as a "fuel shutoff valve".

B. Second Embodiment

In a fuel valve 10b of the second embodiment, the structure of a check valve case 140b is different from the structure of the check valve case 140 of the fuel valve 10 of the first embodiment. Other aspects of the fuel valve 10b of the second embodiment are the same as the fuel valve 10 of the first embodiment.

Figure 11:
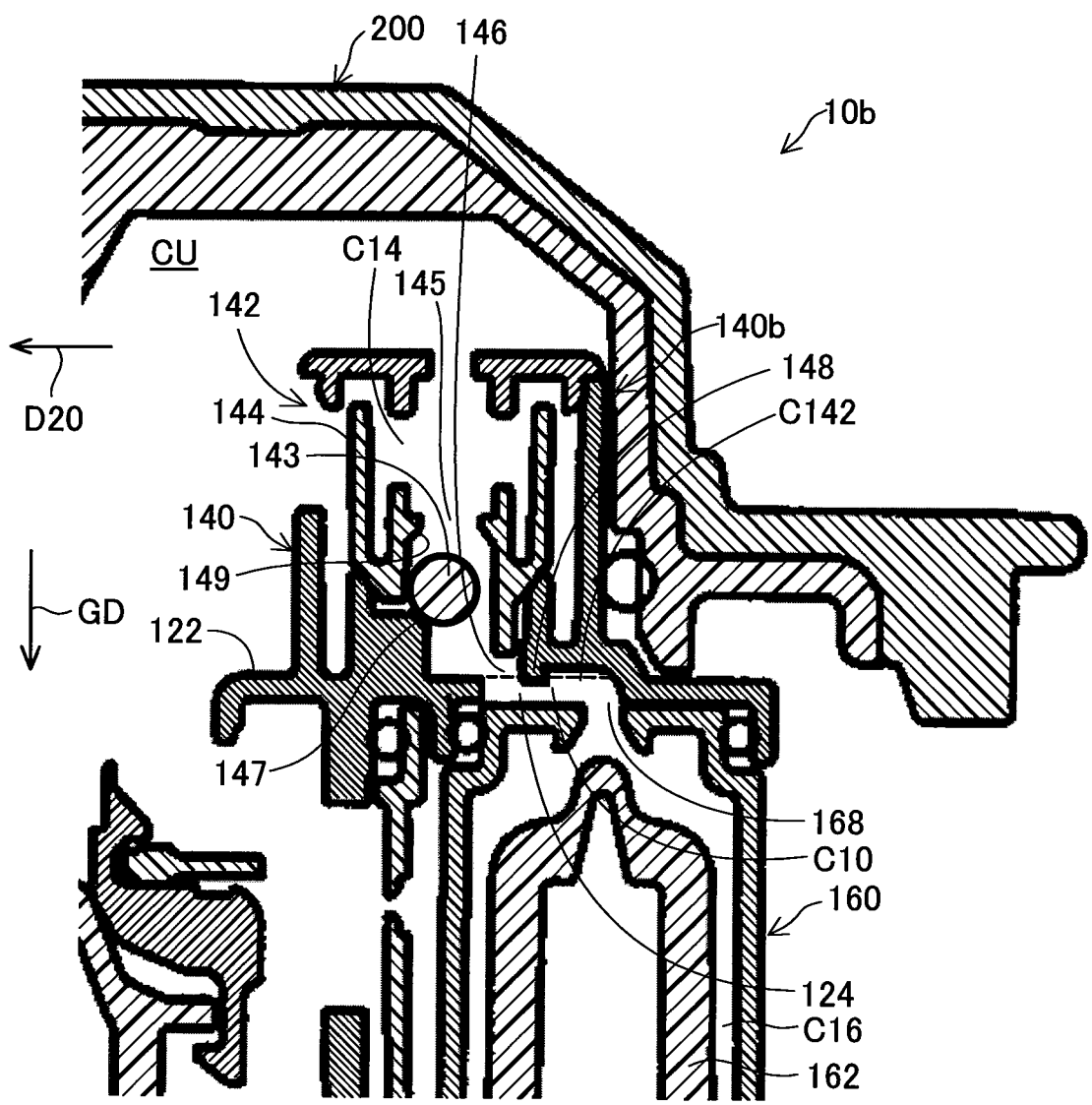
FIG. 11 is an enlarged view of the vicinity of a check valve case 140b according to a second embodiment.

FIG. 11 is an enlarged view of the vicinity of the check valve case 140b according to the second embodiment. FIG. 11 corresponds to FIG. 10 of the first embodiment. The check valve case 140 includes a projection 148 projecting toward the cutoff valve case 160 in the additional flow path part C142. More specifically, the projection 148 is provided at an end connected to the reception opening 146 in the additional flow path part C142. The projection 148 has a lower height than the communication passage C10 in the vertical direction GD. The projection 148 has a size over the entire width of the communication passage C10 in the direction perpendicular to the vertical direction GD and the direction D20.

With such a structure, it is possible to (i) secure the circulation of fuel vapor from the inside of the cutoff valve case 160 to the inside of the check valve case 140, and (ii) reduce a possibility that, when liquid fuel having passed through the cutoff valve case 160 enters the communication passage C10, the liquid fuel enters the check valve case 140.

C. Other Forms

C1. Other Form 1:
In the above-described embodiments, the full tank detection valve case 180 and the cutoff valve case 160 are arranged next to each other in the fuel valve 10 (see FIG. 2, FIG. 3, and FIG. 5). However, the fuel shutoff valve may not include the full tank detection valve case 180, and may include the check valve case 140 and the cutoff valve case 160.

C2. Other Form 2:
In the above-described embodiments, the upper part of the fuel valve 10 is positioned outside the fuel tank FT. For example, the check valve case 140 is positioned outside the fuel tank FT (see FIG. 1). However, the fuel valve 10 may be attached to the fuel tank FT so that the entire fuel valve 10 is positioned inside the fuel tank FT.

C3. Other Form 3:
In the above-described second embodiment, the projection 148 has a lower height than the communication passage C10 in the vertical direction GD, and has a size over the entire width of the communication passage C10 in the direction perpendicular to the vertical direction GD and the direction D20. However, the projection 148 may have another shape with the same height as the communication passage C10 in the vertical direction GD and a width corresponding to a part of the width of the communication passage C10 in the direction perpendicular to the vertical direction GD and the direction D20, for example. That is, the projection 148 only needs to have a shape occupying a part of the communication passage C10 when projected in the circulation direction of the fuel vapor in the communication passage C10.

C4. Other Form 4:
In the above-described second embodiment, the projection 148 is provided at an end connected to the reception opening 146 in the additional flow path part C142. However, the projection 148 may be provided at another region such as an end connected to the delivery opening 168 of the cutoff valve case 160 or a part between the end connected to the reception opening 146 and the end connected to the delivery opening 168 in the additional flow path part C142.

C5. Other Form 5:
In the above-described embodiment, the check valve case 140 includes one projection 148. However, a plurality of projections 148 may be provided.

C6. Other Form 6:
In the above-described embodiment, the additional flow path part C142 is provided over the entire communication passage C10. However, the additional flow path part C142 may be provided at one part along the direction of a liquid flow in the communication passage C10.

C7. Other Form 7:

In the above-described embodiment, the check valve case 140 includes one additional flow path part C142. However, a plurality of additional flow path parts C142 may be provided.

C8. Other Form 8:

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) One aspect of the disclosure provides a fuel shutoff valve including a casing that allows circulation of fuel vapor in a fuel tank and a lid body that is attached to one end of the casing to change a direction of the circulation of fuel vapor having passed through the casing and send the fuel vapor to the outside. In the fuel shutoff valve, the casing includes a housing that is provided with a partition part dividing the inside of the casing into an upper space and a lower space, the partition part having a communication hole allowing communication between the upper space and the lower space, a check valve case that supports, in the upper space, a check valve structure maintaining an inner pressure of the fuel tank in a predetermined range, and a cutoff valve case that stores, in the lower space, a float functioning as a cutoff valve preventing an outflow of liquid fuel through the casing. The casing includes a communication passage connecting a space storing the float in the cutoff valve case and a space communicating to the outside in the check valve case, the communication passage including a delivery opening provided in the cutoff valve case, the communication hole provided in the partition part, and a reception opening provided in the check valve case. The reception opening is arranged at a position deviating to the inner side of the fuel shutoff valve relative to the delivery opening. The check valve case includes an additional flow path part that is a part of the communication passage, the additional flow path part allowing the circulation of fuel vapor from the delivery opening to the reception opening together with the communication hole.

In such a form, in the fuel shutoff valve exerting the functions of the cutoff valve and the check valve, it is possible to downsize the fuel shutoff valve as a whole as compared with the form in which the delivery opening of the cutoff valve case and the reception opening of the check valve case are arranged at positions where the central axes thereof match each other.

Moreover, the communication passage connecting the delivery opening of the cutoff valve case and the reception opening of the check valve case, which deviate from each other, includes not only the communication hole provided in the partition part but also the additional flow path part provided in the check valve case. Thus, as compared with the form without such a structure, it is possible to allow fuel vapor to circulate more smoothly from the delivery opening of the cutoff valve case toward the reception opening of the check valve case.

(2) In the fuel shutoff valve of the above-described form, the check valve case may include a projection projecting toward the cutoff valve case in the additional flow path part.

In such a form, it is possible to (i) secure the circulation of fuel vapor from the inside of the cutoff valve case to the inside of the check valve case, and (ii) reduce a possibility that, when liquid fuel having passed through the cutoff valve case enters the communication passage, the liquid fuel enters the check valve case.

The disclosure may be achieved by various forms other than the fuel shutoff valve. For example, the disclosure may be achieved by the forms of a fuel tank, a method of manufacturing a fuel shutoff valve or a fuel tank, and the like.

The present disclosure is not limited to the above-described embodiments and may be achieved with various configurations without departing from the scope of the disclosure. For example, the technical features in the embodiments corresponding to the technical features of each aspect in the summary may be appropriately replaced or combined in order to solve a part or all of the above-described problems or achieve a part or all of the above-described effects. Moreover, unless the technical features are explained as necessary in the specification, they may be deleted appropriately.

What is claimed is:

1. A fuel shutoff valve, comprising:
   a casing that allows circulation of fuel vapor in a fuel tank; and
   a lid body that is attached to one end of the casing to change a direction of the circulation of fuel vapor having passed through the casing and send the fuel vapor to an outside, wherein
   the casing includes
   a housing that is provided with a partition part dividing an inside of the casing into an upper space and a lower space, the partition part having a communication hole allowing communication between the upper space and the lower space,
   a check valve case that supports, in the upper space, a check valve structure maintaining an inner pressure of the fuel tank in a predetermined range, and
   a cutoff valve case that stores, in the lower space, a float functioning as a cutoff valve preventing an outflow of liquid fuel through the casing,
   the casing includes a communication passage connecting a space storing the float in the cutoff valve case and a space communicating to the outside in the check valve case, the communication passage including a delivery opening provided in the cutoff valve case, the communication hole provided in the partition part, and a reception opening provided in the check valve case, wherein
   the check valve structure is configured such that the communication passage is blocked when the check valve structure is closed,
   the reception opening is arranged at a position deviating to an inner side of the fuel shutoff valve relative to the delivery opening, and
   the check valve case includes an additional flow path part that is a part of the communication passage, the additional flow path part allowing the circulation of fuel vapor from the delivery opening to the reception opening, together with the communication hole.

2. The fuel shutoff valve according to claim 1, wherein the check valve case includes a projection projecting toward the cutoff valve case in the additional flow path part.

* * * * *